United States Patent [19]

Muhle et al.

[11] Patent Number: 4,508,859

[45] Date of Patent: Apr. 2, 1985

[54] FINISHING OF ROTATIONAL MOLDING GRADE RESIN

[75] Inventors: Mike E. Muhle, Kingwood; Richard J. Stolz, LaPorte; Cecil W. Wright, Baytown, all of Tex.

[73] Assignee: Exxon Research & Engineering Co., Florham Park, N.J.

[21] Appl. No.: 452,269

[22] Filed: Dec. 22, 1982

[51] Int. Cl.³ .............................................. C08J 3/20
[52] U.S. Cl. ...................................... 523/346; 523/351
[58] Field of Search ............................... 523/346, 351

[56] References Cited

U.S. PATENT DOCUMENTS

| | | | |
|---|---|---|---|
| 2,540,146 | 2/1951 | Stober | 523/351 |
| 3,275,591 | 9/1966 | Tomlinson | 523/351 |
| 3,413,249 | 6/1964 | Luftglass et al. | 523/351 |
| 3,496,133 | 2/1970 | Hoffman | 523/351 |
| 3,932,323 | 1/1976 | Perry | 523/351 |
| 4,116,908 | 9/1978 | Emery | 523/351 |

Primary Examiner—Joseph L. Schofer
Assistant Examiner—N. Sarofin
Attorney, Agent, or Firm—Robert L. Graham

[57] ABSTRACT

Rotational mold grade resin is made by subjecting polyolefin to the following process: (1) polyolefin granules are blended with additives to form a masterblend; (2) the masterblend is intensively mixed with additional resin granules to shape the granules, reduce particle size and disperse additives; (3) the intermixed material is cooled and (4) large particles are removed and recycled.

15 Claims, 1 Drawing Figure

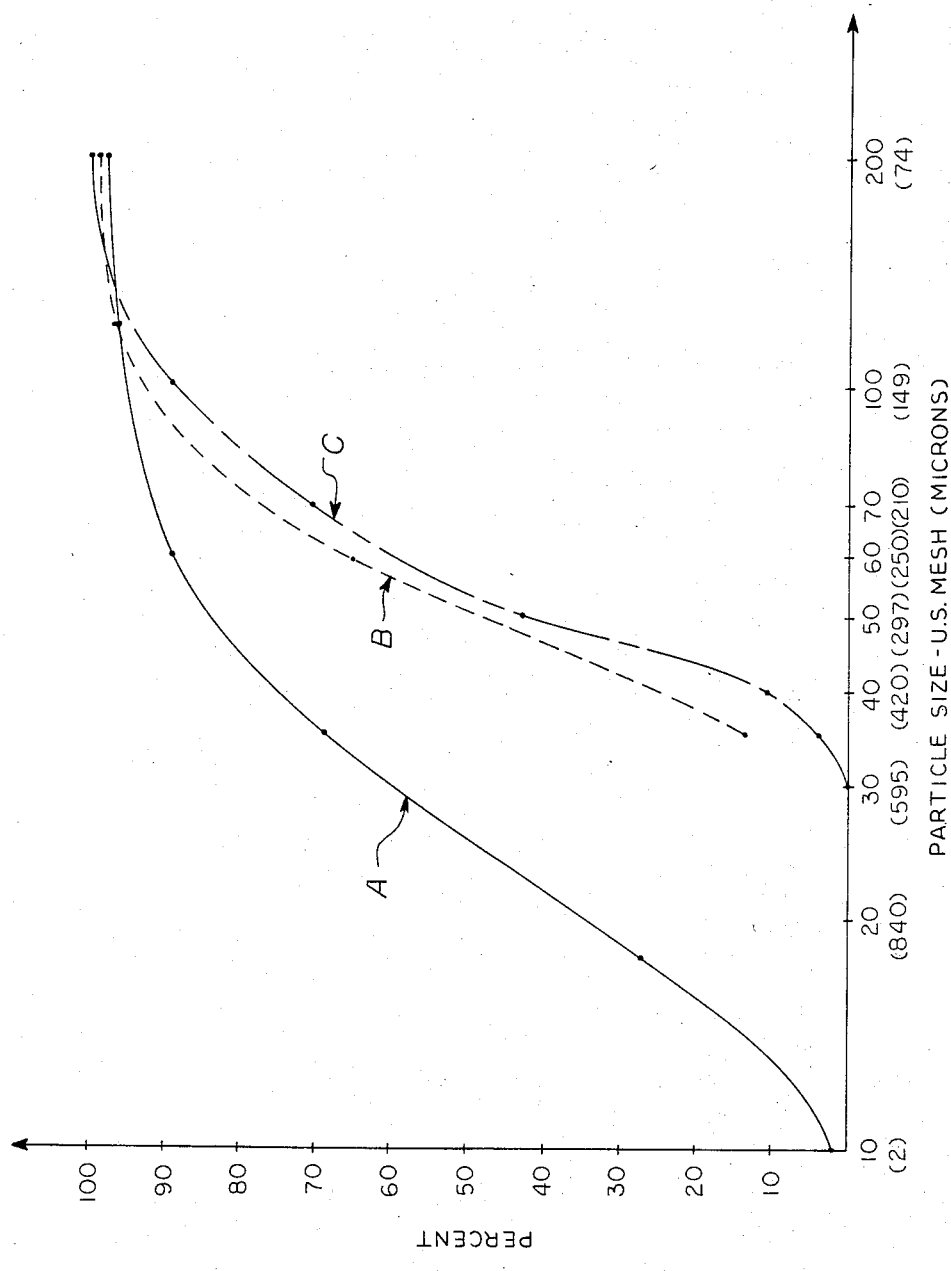

FINISHING OF ROTATIONAL MOLDING GRADE RESIN

BACKGROUND OF THE INVENTION

This invention relates to a rotational molding of powdered polyolefins. In one aspect, it relates to a method of preparing granular resin for use in rotational molding of plastic products. In another aspect, the invention relates to a method for shaping of and incorporating additives onto rotational molding resin.

In one type of rotational molding, a granular polymer is placed in a mold and heated while rotating the mold. The granular polymer melts as the temperature increases forming a homogeneous layer of uniform thickness on the mold walls. Following cooling of the mold to solidify the polymer, the mold is opened and the finished product removed.

Rotational molding resins should satisfy the following criteria:

1. The granules must be free flowing in order to permit charging to the mold and conforming to the mold configuration.
2. The granules should be substantially spherical in shape and free of any tails or hairs which could interfere with the flowability of the particles.
3. The particle size should be relatively small and the particle size distribution of the granules should be relatively narrow (less than 5.0 weight percent larger than about 30 mesh and only minor amounts (less than 15%) finer than 100 mesh.
4. The bulk density of the granules should be high to provide good flowability, close compaction in the mold, and reduce shipping costs.
5. The additives (e.g. antioxidants, UV stabilizers, etc.) should be thoroughly dispersed in the granules and preferably in contact with all granules because no mixing occurs during molding.

The principal prior art technique for preparing resin for rotational molding involves the following two steps: (1) The resin is pelletized during which additives are melt compounded and (2) The pellets are ground and classified to the proper particle size. The pelletizing and grinding operations not only adds to the expense due to increased energy requirements, but frequently produces irregularly shaped particles or fragments having hairs of tails which impede flowability and reduce bulk density. Moreover, the melt blending step carried out at elevated temperatures can result in poor end use performance of the product, production or polymer degradation. As mentioned previously, all of these factors can contribute to a poor quality rotomolding product.

BRIEF DESCRIPTION OF THE DRAWING

The drawing is a graph comparing particle size distribution of polyethylene resin before and after processing according to the present invention.

SUMMARY OF THE INVENTION

It has been discovered that certain thermoplastic (preferably polyolefins) resins produced in granular form can be processed directly to make them suitable for rotational molding applications. This avoids the expensive steps of pelletizing and grinding. The process for producing the rotomolding grade resin involves the following steps:

(1) blending the polyolefin granules with additive material at a ratio wherein the additive material comprises from 10,000 to 100,000 PPM of the blend (preferably 15,000 to 50,000 PPM) and at a temperature less than the softenining point of the polyolefin.

(2) mixing additional thermoplastic granules and the masterblend in an intensive mixer in a granules/masterblend weight ratio of between about 5:1 to 50:1 (preferably 10:1 to 40:1) to provide additive material concentration of between about 500 PPM to 10,000 PPM (preferably 1,000 to 5,000 PPM) based on the combined weight of the granules and additive material and at a temperature greater than the softening point of the polyolefin and wherein the additive material is incorporated into or unto the polyolefin granules, said mixing step continuing until at least 80% of the granules are smaller than about 30 mesh and the bulk density has been increased by at least 10% (preferably at least 20%) 20% over unfinished granules.

(3) withdrawing the mixture from the intensive mixer and causing the mixture to cool forming free-flowing granules containing additives thereon; and (4) removing substantial amounts (at least 95% by wt.) particles larger than about 30 mesh, and preferably at least 98 wt%.

The additives are preferably particulate materials which fuse the intensive mixing step and at least partially coat the resin granules.

Tests have shown that the granules finished in accordance with this procedure are ideally suited for rotational molding, requiring no additional particle shaping or classification.

As used herein, the term "softenining point" means the temperature range at which the thermoplastic resin, or at least its outer surface, becomes tacky and "fusion temperature" as used herein means the temperature or temperature range at which the additive becomes sufficiently flowable to at least partially coat the resin granules. The term "granules" means resin particles in the same general form and size (before processing by the present invention) as discharged from the reactor. Granules are to be distinguished from (a) pellets which have been melt processed into uniformly sized and shaped particles of generally regular shape and (b) from "powder" or "fines" which have a particle size smaller than 200 mesh. (All "mesh sizes" are expressed in terms of U.S. Sieve Series.)

Additives for rotational molding grade resins include storage stabilizers, UV stabilizers, process stabilizers, pigments, and the like and are available in particulate form (normally smaller in particle size than the resin granules, with ranges in particle size between about 1 micron to about 1000 microns). Liquid additives and additive solutions may also be used. Most of the particulate additives for rotomolding melt at intensive mixing temperatures. These additives, being liquid and flowable at intensive mixing conditions, coat the granules during this step of the process. The coating of the individual resin granules provides additive on each granule and ensures even additive dispersement throughout the bulk material. This is extremely important in rotational molding grade resins because the granules in the mold remain fixed until fusion occurs. Granules without additives result in a defect in the molded product.

The initial step of forming the masterblend may be carried out in a blender such as a ribbon blender operated at a temperature below the resin softening temperature. This produces a blend of the resin granules containing a minor amount of additives dispersed therein. The masterblend thus provides an initial dispersement of the additives on the thermoplastic resin granules and facilitates the more thorough additive dispersement in the intensive mixer. The concentration of the additives in the masterblend is selected to provide the desired concentration in the total volume of resin treated after additional granular resin is added. This allows for easier quality control in the finished product since a single component can be analyzed and the others determined by the masterblend ratio.

The second step of the process is provided by an intensive mixer which may include a horizontal drum having rotating arms mounted therein. Resin granules and masterblend granules are continuously fed into the drum and are intermixed by the action of the rotating arms. This action generates heat by the impingement of the particles and granules on each other and by contact with the blades and wall. The intensive mixing thus achieves these desirable results, all of which are important for rotational molding grade resins:

1. The granules are rounded as a result of the rough edges being smoothed, increasing the bulk density of the product and improving granule shape factor and resultant flowability and conformability in the rotomold.
2. The resin softening temperature and additive fusion temperature (in the case of fusible particulate additives) is reached causing the material to melt and coat or diffuse into the resin. Maintenance of the resin softening temperature also aids in increasing the bulk density of the granules. The collision of the masterblend granules with the virgin resin granules results in the transfer of additive. It has been observed that there is essentially no difference between the masterblend granules and the virgin granules in the amount of additives thereon. In the case of liquid and particulate additives, the material is dispersed onto or into the granules.
3. Agglomerates of granules are broken apart into smaller agglomerates or undivided particles reducing the average particle size of the bulk material to that usable in rotational molding applications.

The critical parameters in the intensive mixing step include residence time and temperature of the resin. Conditions must be such to provide sufficient residence time to cause a substantial reduction in particle size, to improve particle shape, and to result in uniform mixing of the masterblend with the virgin resin granules. Tests indicate that tip speeds of the intensive mixer arms in the range of about 60 to about 110 feet per second provide best results. Tip speeds below this level do not generate sufficient kinetic energy to attain resin softening temperature and sufficient particle shaping or size reduction and tip speeds above 110 ft/sec. results in excessive energy input which is not only costly but could cause granule agglomeration or excessive fines generation.

In the cooling step, the granules are continuously withdrawn from the intensive mixer and pneumatically conveyed through a cooling system to separate and solidify the discrete granules thereby resulting in a free-flowing product.

Removal of the large particle (e.g. greater than about 30 mesh) is essential for rotomolding resin. Large particles are undesirable for two reasons: (1) they produce uneven wall thickness of the molded product, and (2) they result in nonuniform additive dispersement in the molded product.

In a preferred embodiment of the invention, the resin granules are rotational molding grade linear low density polyethylene produced by gas phase process. This resin has a mesh size between 5 and 200 with only about 25 wt % being between 35 and 100 mesh and thus are unsuited for rotomolding as discharged from the polymerization reactor. The process of the present invention however converts these granules to usable form by achieving the following:

1. granules are shaped substantially spherical, free of hairs and tails. This provides for good flowability.
2. The bulk density is increased which reduces shipping and storage costs and rotational molding is improved.
3. The proper rotational molding particle size distribution is obtained without pelletizing and grinding.
4. Additives are incorporated onto all resin granules.

Examples of other granular rotomold grade resin include high density polyethylene, polypropylene, copolymers and blends of these.

DESCRIPTION OF THE PREFERRED EMBODIMENTS

As mentioned previously, the method of the present invention is particularly suited for shaping and incorporating additives into rotational molding grade linear low density polyethylene (LLDPE) produced by low pressure process, gas phase or liquid slurry. LLDPE is made by polymerizing, in the presence of a suitable catalyst, ethylene with an $\alpha$-olefin comonomer that contributes the side chain and hence lowers density. Comonomer, either singly or in combination, such as polypylene, butene-1, hexene-1, octene-1, 4-methylpentene-1 and pentene-1 is used. Granular LLDPE may be made by gas phase fluidized bed, or gas phase stirred bed. In order to make the granules suitable for rotational molding applications, they must be subjected to a finishing operation to impart the desired shape, size and properties.

The properties which must be improved by additives include UV stabilization and storage stabilization. Such additives include organic and inorganic stabilizers, antioxidants, pigments, etc. available in particulate and/or liquid form. As mentioned previously, it is important that these additives contact essentially each granule used in rotational molding because very little or no mixing occurs in the mold.

The low pressure gas phase processes produce a granular polyethylene having a rather broad particle size distribution between about 5 and 200 mesh and a bulk density of between about 20 to about 32 pounds per cubic foot, typically between 24 to 28 pounds per cubic foot. Curve A in the Drawing illustrates a typical LLDPE particle size distribution as produced by a gas phase polymerization. Curve C illustrates the desirable particle size distribution for rotomolding grade resins. The present invention not only finishes the granules to approach Curve C but also shapes the granules and provides additives on essentially all of the granules. These factors also combine to improve bulk density and flowability.

Briefly, the finishing process of the present invention involves the following steps:
1. preparation of a masterblend
2. intensive mixing of masterblend with virgin resin
3. cooling, and 4. removal of large particles.

The first three steps may be carried out using the facilities described in Applicants' copending application Ser. No. 437,055, filed Oct. 27, 1982, the disclosure of which is incorporated herein by reference.

A conventional blender may be used to prepare the masterblend at temperatures below the softening point of the resin and below fusion temperature of the additive material. A variety of low speed blenders are suitable fo this purpose. A horizontal ribbon blender such as that manufactured by Young Industries, Inc. is an example of a blender useable in the present invention.

A variety of high intensive mixers may also be used, but the horizontal continuous type with rotating blades is preferred because it permits resin finishing to be carried out at the same rate as resin production from the reactor. A particularly useful mixer is of the type manufactured by Wedco International, Inc. and described in Applicants' application Ser. No. 437,055 mentioned above.

The particles upon leaving the mixer pass an agitation cooling stage to solidify the resin and additives. This stage of the operation may be provided by a line having a heat exchanger. Air may be introduced by agitate and convey the granules through a cooling system such as a heat exchanger to storage. The final step in the process is to remove large granules. A 30 or 35 mesh screen may be used for this purpose. The large granules removed are recycled through the intensive mixer. No accumulation of these large particles has been observed due to the recycle indicating the intensive mixer further reduces the particle size.

In operation, resin granules are delivered to the finishing facilities in essentially the same form and shape as discharged from the reactor. In the case of LLDPE, the granules are irregularly shaped, agglomerates of smaller particles and have a typical particle size distribution as shown in Curve A of the Drawing.

The granules are admixed with additives (e.g. antioxidants, UV stabilizers, pigments, etc.,) to form the masterblend. The additives may be introduced in particulate or liquid form. However, in order to insure uniform dispersement the particulate additives should be fusible at the operating temperature of the intensive mixer. The smaller particulate additives tend to lightly adhere to larger resin granules due to electrostatic charges, and the liquid additives lightly coat the resin granules in the masterblend. Liquifiable particulate additives disperse in the granules.

Virgin resin and masterblend are fed into the mixer in the desired weight ratio. Rotation of mixer arms mixes the masterblend and virgin resin as the mass flows horizontally through the drum from the inlet to its outlet. The granule collisions with each other, the rotating members, and the walls (1) creates friction which generates heat, (2) rounds the granules, (3) transfers some of the additives from the masterblend granules to the virgin resin granules, and (4) breaks apart agglomerates.

The incorporation of additives into or onto the resin granules is accomplished in an intensive mixer by operating at a temperature above the resin softening temperature and the additive fusion temperature of particulate additives. These additives melt and coat along the surface of both the masterblend granule and the virgin resin granule. Liquid additives similarly coat the granules. Upon cooling, the additive will encapsulate the granule. Highly volatile additives may diffuse into the granule under these same conditions. The irregular surface and porosity of the granules aids in the coating action by entrapping additive material. The collision of the granules plays a significant role in additive transfer and dispersion.

The type of additives and final concentration will depend upon the final product. Total additive levels for rotational grade resins normally ranges between about 500 to 10,000 ppm. Other nonliquid additives such as calcium stearate (catalyst neutralizer) may also be present. These particles are also distributed and transferred from particle to particle by particle collision and impregnation therein.

The increase in granular bulk density follows two separate mechanisms. Bulk density in a material such as granular LLDPE is dependent on two factors:

Particle size distribution
Particle shape

Particles exiting from the LLDPE fluid bed reactor contain agglomerates of smaller particles and very irregularly shaped particles. By subjecting the particles to an intensive mixer, both the particle size distribution and the particle shape are improved. The mixing action breaks up the large agglomerates resulting in a downward shift in the particle size distribution. (The average particle size is reduced by at least 25% and preferably by at least 50%). The heating of the granule surface aids in the particle shape due to the mixing action and subsequent polishing. The sharp edges are smoothed out, and other irregular shapes may be brought to resemble more rounded or spherical granules. The combination of breaking down large agglomerates and rounding the particles results in better packing and thus increased bulk densities. Moreover, the polishing action avoids formation of any hairs or tails that could impair flowability and decrease bulk density.

In rotomolding applications it is highly desirable that the granules be substantially spherical and have a narrow particle size distribution and small average particle size. The residence time in the mixer affects all of these properties.

The operating temperature is a function of residence time—the longer the residence time, the more kinetic energy expended causing an increase in resin temperature. It has been found that best results are obtained with rotational molding grade LLDPE at resin temperatures between 230° F. and 240° F.

Operating the intensive mixer to cause the resin to reach this temperature produces an LLDPE granule having a particle size distribution as follows:

larger than 30 mesh less than 20 wt %
smaller than 100 mesh less than 15 wt %

After screening with a 30 mesh screen, the granules exhibit a flowability of greater than 3.6 g/sec. based on ASTM D 1895-69 test method. The intensive mixer operating at a temperature to 230°-240° F. rounded the granules, reduced their average particle size by at least 40%, and increased the bulk density by at least 20%; all of which enhance rotational molding capabilities.

The finished product is free flowing and is ready for use in rotational molding operations.

Rotational molding involves the following basic steps:

1. The cavity of an unheated mold is charged with a predetermined weight of the granules. (The free flowing characteristic and high bulk density aid in this step).
2. The charge mold is placed in an oven and heated while simultaneously rotating around two axes.

3. The double revolving motion results in formation of hollow objects in the mold cavity, the powder being evenly distributed to form walls of uniform thickness when the resin fuses. The spherical granules free of hairs and tails and high bulk density aids in the granules conforming to the mold. Also, the uniform dispersement of the additives is important since no mixing occurs in the mold. The small amount of fines (smaller than 100 mesh) is also important to fill the interstices between the larger particles.
4. After all the resin particles have fused forming a homogeneous layer on the mold walls, the mold is cooled while still being rotated.
5. The mold is opened and the molded part removed.

The following examples demonstrate the effectiveness of the present invention in producing rotational mold grade resin.

EXAMPLES

Facilities

Tests were conducted using an intensive manufactured by Wedco, Model BP-2030. The mixer included the following:

| | |
|---|---|
| Drum Size | diameter - 20 inches |
| length | 30 inches |
| Motor | 25 HP |
| Tip Speed of rotating arms | 60 ft/sec., 110 ft/sec. |

Test Procedure

Each prepared masterblend was mixed with LLDPE and introduced into the mixer along with virgin resin in a 1:10 blend ratio (by weight). The discharge valve of the Wedco was controlled to maintain a constant temperature at the resin discharge. The resin residence time in the Wedco ranged between ½ and 5 minutes. The resin was cooled by pneumatically conveying the Wedco discharge to storage and experiments 10-15 were screened with a 30 mesh screen. The resin used was LLDPE having the following properties:

| | |
|---|---|
| Melt Index | 5 dg/min |
| Density | 0.926-0.934 g/cc |
| Average particle size | 0.031/in |
| Bulk density | 24-26 #/ft$^3$ |
| Softening point | ~230° F. |

Experiments 1-12 (Table I)

In experiments 1 through 12 (Table I) LLDPE was treated to incorporate the following additives;

| Additives: | |
|---|---|
| UV Stabilizer* | 2000 ppm based on total compound |
| Organic Stabilizer* | 300 ppm based on total compound |

*See notes 1 and 3 in Table II.

A masterblend of each sample was prepared and intermixed with virgin resin at a weight ratio of 1:10 to provide the concentration indicated above. The temperature was varied as indicated in Table I. The optimum temperature was 235° F. These tests indicate that operating temperature in the 230°-240° F. range produce the best results of rotational molding grade LLDPE. Lower temperatures do not provide sufficient residence time and higher temperature produce agglomeration.

Experiments 13-15 (Table II)

In these experiments the same resin described above was used with the additives shown in Table II. Table III shows the particle size distribution for the samples before finishing along with particle size distribution following finishing at 235° F.

The curves in the drawing are based on Experiments 13-15. Curve A shows the average particle size distribution for the 3 samples before finishing; Curve B is the average particle size distribution for the 3 tests following finishing; and Curve C is the recommended particle size distribution for rotational molding grade resin. As can be seen in the drawing, Curve B reasonably tracks Curve C indicating suitable particle size distribution for rotational molding. Moreover, the individual granules were observed to be substantially spherical and free of tails and hairs.

Samples produced by test runs 13, 14 and 15 were used in rotational molding. The molded products were made without difficulty and age testing indicated the stabilizers were effectively incorporated into this resin.

The following can be concluded from the above tests:
1. The particle size distribution characteristics of resins finished according to the process of the present invention meets the criteria for rotational molding grade resins.
2. The granules were substantially spherical, free of hairs and tails and exhibited flowability within rotational molding applications.
3. The bulk density was increased substantially (by at least 10%).
4. Additives were incorporated onto or into substantially all of the granules.

The above examples demonstrate the effectiveness of the method in connection with processing LLDPE for producing rotational molding grade resin. However, it will be appreciated by those skilled in the art that the method may be used also in processing other granular polyolefins useable in rotational molding.

TABLE I

SUMMARY OF EXPERIMENTS 1-15

| Experiment No | Tip Speed (ft/sec) | Outlet Temp (°F.) | Wt. % retained, U.S. Mesh | | | | | | | Poured Bulk Density (lb/ft$^3$) | Flowability* (g/sec.) |
|---|---|---|---|---|---|---|---|---|---|---|---|
| | | | 10 | 18 | 30 | 60 | 100 | 200 | PAN | | |
| Unfinished Resin | — | — | 1.3 | 21.6 | 38.4 | 29.3 | 4.9 | 2.6 | 1.9 | 24.1 | 4.5 |
| 1 | 60 | 210 | 0.3 | 3.9 | 16.9 | 45.0 | 18.0 | 8.7 | 7.2 | 28.9 | 4.1 |
| 2 | 60 | 215 | 0.2 | 3.9 | 16.1 | 45.3 | 18.2 | 9.0 | 7.2 | 29.2 | 4.3 |
| 3 | 60 | 220 | 0.4 | 5.1 | 17.5 | 44.2 | 17.9 | 8.6 | 6.2 | 29.5 | 4.2 |
| 4 | 60 | 225 | 0.1 | 4.2 | 16.5 | 43.5 | 19.4 | 8.8 | 7.4 | 29.4 | 4.3 |

TABLE I-continued
SUMMARY OF EXPERIMENTS 1-15

| Experiment No | Tip Speed (ft/sec) | Outlet Temp (°F.) | Wt. % retained, U.S. Mesh | | | | | | Poured Bulk Density (lb/ft³) | Flowability* (g/sec.) |
|---|---|---|---|---|---|---|---|---|---|---|
| | | | 10 | 18 | 30 | 60 | 100 | 200 | PAN | | |
| 5 | 60 | 230 | 0.0 | 2.8 | 13.1 | 44.0 | 21.7 | 10.6 | 7.7 | 30.1 | 4.1 |
| 6 | 60 | 235 | 0.0 | 2.0 | 12.7 | 46.2 | 22.9 | 10.0 | 6.2 | 29.7 | 4.8 |
| 7 | 110 | 210 | 0.5 | 4.0 | 17.6 | 43.8 | 18.6 | 8.6 | 7.0 | 28.5 | 4.3 |
| 8 | 110 | 220 | 0.6 | 5.3 | 17.6 | 43.5 | 18.0 | 8.6 | 6.3 | 29.0 | 4.4 |
| 9 | 60 | 235 | 0.0 | 3.1 | 12.6 | 46.5 | 26.6 | 9.6 | 1.5 | 29.5 | 3.8 |
| 10 | 60 | 235 | 0.0 | 0.0 | 2.2 | 53.0 | 26.3 | 12.4 | 6.0 | 29.4 | 3.6 |
| 11 | 60 | 235 | 0.0 | 0.0 | 1.7 | 46.3 | 30.3 | 14.4 | 7.2 | 29.3 | 3.6 |
| 12 | 60 | 235 | 0.0 | 0.0 | 1.6 | 47.9 | 30.3 | 14.4 | 5.8 | 29.6 | 3.6 |

NOTE:
Flowability determined by the method and funnel specified in ASTM D 1895-69. A 100 gram sample was used for all cases.

TABLE II
ADDITIVES AND CONCENTRATIONS FOR ROTATIONAL MOLDING GRADE RESINS

| Experiment No. | Calcium Stearate | Organic Stabilizer[1] | Phosphite Stabilizer[2] | Organic UV Stabilizer[3] | Organic U.V. Stabilizer[4] | Total Additive |
|---|---|---|---|---|---|---|
| 13 | — | 500 | — | 3000 | — | 3500 |
| 14 | — | 500 | 2000 | — | 1500 | 4000 |
| 15 | 1000 | 500 | — | — | 1500 | 3000 |

NOTE:
All numbers denote ppm.
[1] Marketed as Irganox 1076 by Ciba Geigy Co. [fusion temp. 122-131° F. (50-55° C.)]
[2] Marketed as Weston 619 by Borg Warner Corp. [fusion temp. 104-158° F. (40-70° C.)]
[3] Marketed as Tinuvin 622 by Ciba Geigy Co. [fusion temp. 266-293° F. (130-145° C.)]
[4] Marketed as UV531 by American Cyanamid [fusion temp. 118-120° F. (48-49° C.)]

TABLE III
PARTICLE SIZE DISTRIBUTION AND BULK DENSITY OF LLDPE RESIN

| Experiment No. | | Wt. % Retained, U.S. Mesh | | | | | | Avg. Particle Size (in) | Poured Bulk Density (lb/ft³) |
|---|---|---|---|---|---|---|---|---|---|
| | | 10 | 18 | 35 | 60 | 120 | 200 | PAN | | |
| 13 | Before | 1.7 | 29.4 | 41.3 | 16.0 | 7.5 | 2.7 | 1.4 | .0328 | 25.7 |
| | After | 0.0 | 0.2 | 13.3 | 53.0 | 29.2 | 3.7 | 0.7 | .0134 | 29.6 |
| 14 | Before | 1.4 | 25.5 | 46.5 | 17.2 | 6.2 | 2.0 | 1.2 | .0318 | 25.9 |
| | After | 0.0 | 0.0 | 13.0 | 48.4 | 32.2 | 6.0 | 0.5 | .0128 | 29.9 |
| 15 | Before | 0.7 | 22.7 | 43.5 | 21.0 | 9.3 | 2.1 | 0.7 | .0293 | 26.7 |
| | After | 0.0 | 0.0 | 13.3 | 54.3 | 31.0 | 1.1 | 0.3 | .0135 | 28.7 |

What is claimed is:

1. A method of finishing polyolefin thermoplastic granules for rotomolding, which comprises:
    (a) blending polyolefin thermoplastic granules and additive material at a temperature below the softening point of the thermoplastic to form a masterblend;
    (b) introducing the masterblend and additional polyolefin thermoplastic granules into an intensive mixer in an additional resin/masterblend weight ratio between about 5:1 and 50:1, and mixing the same (i) until the temperature of the resin reaches its softening point but below its fluxing temperature whereby the additive material is incorporated into or onto substantially all of the granules (ii) until the particle size of the granules is reduced to the extent that at least about 80 weight percent of the granules are smaller than about 30 mesh, and (iii) until the bulk density of the granules is increased by at least 10%;
    (c) withdrawing the granules from the intensive mixer and cooling the particles below the fusion temperature of the additive and below the softening point of the resin; and
    (d) removing essentially all of the particles larger than 30 mesh.

2. The method as defined in claim 1 wherein the additive material is solid in the masterblend and fuses in the intensive mixer to at least partially encapsulate the granules.

3. The method as defined in claim 1 wherein the additive material comprises from 10,000 to 100,000 PPM of the masterblend and from 500 to 10,000 PPM of the mixture discharged from the intensive mixer.

4. The method as defined in claim 1 wherein the thermoplastic is homopolymer or copolymer of linear low density polyethylene (LLDPE) produced process in granular form having an average particle size and particle size distribution greater than that suitable for rotational molding application.

5. The method as defined in claim 4 wherein the LLDPE is produced by low pressure gas phase process.

6. The method as defined in claim 5 wherein the intensive mixer step increases the thermoplastic temperature to a level betwee about 230° F. and about 240° F.

7. The method as defined in claim 6 wherein the additive material is solid in the masterblend has a fusion temperature below 230° F.

8. The method as defined in claim 1 wherein the bulk density of the granules is increased by at least about 10% by the intensive mixing step.

9. The method as defined in claim 4 wherein the average particle size of the granules with additive is at least 25% less than the average particle size of the resin entering the intensive mixer.

10. The method as defined in claim 5 wherein the resin granule is a copolymer of at least 80% ethylene and an α-olefin.

11. The method as defined in claim 10 wherein the α-olefin is 1-butene.

12. The method as defined in claim 1 wherein the particles removed in step (d) are recycled into the intensive mixer.

13. The method as defined in claim 1 wherein the particles following step (d) are substantially spherical and have the following particle size distribution:

Larger than 30 mesh: less than 5 weight percent
30–100 mesh: 80 to 90 weight percent
Smaller than 100 mesh: less than 15 weight percent but more than 5 weight percent 14. The method as defined in claim 13 wherein the particles smaller than 100 mesh comprise between about 5 and about 10 weight percent.

15. The method as defined in claim 1 wherein the thermoplastic is a polymer of linear low density polyethylene produced in granular form and having a density between about 0.924 to 0.940 g/cc, and wherein said intensive mixing step is performed to increase the resin temperature to between 230° F. and 240° F.

* * * * *